United States Patent
Mese et al.

(10) Patent No.: US 6,719,055 B2
(45) Date of Patent: Apr. 13, 2004

(54) METHOD FOR DRILLING AND COMPLETING BOREHOLES WITH ELECTRO-RHEOLOGICAL FLUIDS

(75) Inventors: Ali Mese, Houston, TX (US); Mohamed Soliman, Plano, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 10/061,893

(22) Filed: Jan. 23, 2002

(65) Prior Publication Data

US 2003/0136560 A1 Jul. 24, 2003

(51) Int. Cl.[7] .............................. E21B 43/26; C09K 7/00
(52) U.S. Cl. ................... 166/308; 166/66; 166/250.01; 166/252.5; 175/48; 175/65; 73/152.04; 73/152.55
(58) Field of Search ......................... 166/252.5, 250.01, 166/250.1, 311, 312, 65.1, 66, 90.1, 308; 175/65, 207, 48, 57; 73/152.01, 152.04, 152.46, 152.54, 152.55, 152.18; 507/909

(56) References Cited

U.S. PATENT DOCUMENTS

| | | | | |
|---|---|---|---|---|
| 2,417,850 A | * | 3/1947 | Winslow | 361/207 |
| 2,739,120 A | | 3/1956 | Fischer | |
| 3,047,507 A | * | 7/1962 | Winslow | 252/75 |
| 3,133,592 A | * | 5/1964 | Tomberlin | 166/60 |
| 3,294,169 A | * | 12/1966 | O'Brien | 166/294 |
| 3,294,184 A | * | 12/1966 | O'Brien | 175/65 |
| 3,696,866 A | * | 10/1972 | Dryden | 166/248 |
| 3,880,764 A | * | 4/1975 | Donham | 507/119 |
| 4,140,180 A | * | 2/1979 | Bridges et al. | 166/248 |
| 4,557,142 A | * | 12/1985 | Hensley et al. | 73/152.19 |
| 4,662,438 A | * | 5/1987 | Taflove et al. | 166/245 |
| 4,772,407 A | * | 9/1988 | Carlson | 252/74 |
| 5,087,382 A | * | 2/1992 | Ishino et al. | 252/73 |
| 5,109,922 A | * | 5/1992 | Joseph | 166/65.1 |
| 5,122,293 A | * | 6/1992 | Eusebi et al. | 252/75 |
| 5,282,508 A | * | 2/1994 | Ellingsen et al. | 166/249 |
| 5,595,680 A | * | 1/1997 | Bryant et al. | 252/77 |
| 5,604,441 A | * | 2/1997 | Freese et al. | 324/663 |
| 5,872,443 A | * | 2/1999 | Williamson | 320/160 |
| 5,977,031 A | | 11/1999 | Patel | 507/138 |
| 6,006,831 A | | 12/1999 | Schlemmer et al. | 166/250.01 |
| 6,022,833 A | | 2/2000 | Mueller et al. | 507/203 |
| 6,029,755 A | | 2/2000 | Patel | 175/50 |
| 6,328,102 B1 | * | 12/2001 | Dean | 166/248 |
| 2002/0130429 A1 | * | 9/2002 | Endo et al. | 264/13 |

FOREIGN PATENT DOCUMENTS

| | | | | |
|---|---|---|---|---|
| DE | 3830836 A1 | * | 3/1990 | B64C/13/46 |
| EP | 0381198 A1 | * | 8/1990 | F16F/13/00 |
| JP | 406234985 A | * | 8/1994 | C10M/103/02 |
| WO | WO 00/41480 | | 7/2000 | |

OTHER PUBLICATIONS

Paul Huibers, Surfactant Self–Assembly, Kinetics and Thermodynamics of Micellar and Microemulsion Systems,, University of Florida PhD Thesis, Chapter 3 (dated 1996, exact publication date uncertain).

* cited by examiner

*Primary Examiner*—David Bagnell
*Assistant Examiner*—Jennifer H Gay
(74) *Attorney, Agent, or Firm*—Criag W. Roddy; Karen B. Tripp

(57) ABSTRACT

A method is described for using an electro-rheological fluid as a drilling and completion fluid or as a well service or fracturing fluid. By adjusting the viscosity of the fluid through application of an electrical potential to the fluid, the fluid has enhanced flexibility and multiplicity of purpose over prior art fluids.

16 Claims, 2 Drawing Sheets

(2 of 2 Drawing Sheet(s) Filed in Color)

METHOD FOR DRILLING AND COMPLETING BOREHOLES WITH ELECTRO-RHEOLOGICAL FLUIDS

BACKGROUND OF THE INVENTION

1. Field of the Invention

The present invention relates to drilling and completion fluids for use in drilling or completing boreholes penetrating subterranean formations and to methods of drilling or completing boreholes employing such fluids.

2. Description of Relevant Art

Choice of a particular type of drilling, completion or fracturing fluid depends on the subterranean formation characteristics, including geologic formations and mineralogy, borehole stability requirements, presence of any abnormal pressure zones in the formation, and any need to prevent underground water pollution. Whenever one of such existing conditions changes, then the entire fluid system may have to be modified based on the new conditions. Such changes in the fluid system are expensive and time-consuming. Moreover, the fluid system that may properly solve an encountered problem may be less than optimum for the rest of the drilling column.

Mud rheology plays a fundamental role in drilling oil and gas wells. If the rheology of the fluid is not appropriate for the formation and physical conditions of the well, the drilling operations may be spoiled with drilling problems such as lost circulation, poor hole cleaning, fracturing phenomena of the crossed formations, and stuck pipe, for example. Some of the main drilling parameters involved are cutting, lifting and hole cleaning efficiencies (resulting both from variation of the velocity profile of the fluid flow, and from variation of the rheological parameters), and the pressure spatial distribution along the well profile. It is extremely important for the drilling fluid to be able to transport cuttings up to the well surface without any restriction in any of the existing annulus sections. Such unrestricted transport depends on many parameters including the geometry of the annulus section, the rotation velocity of the drill string, the rate of drill bit penetration into the formation, the flow rate of the drilling fluid, the cuttings characteristics, and above all the rheology of the used drilling fluid. It is very important to keep a constant limit on the concentration values of the cuttings during the cuttings transport to avoid solid particle deposition inside the well, risking problems of borehole occlusion, bit balling, and drill string sticking during the drilling process.

Although the efficiency of a number of different drilling fluids in transporting cuttings has been reported at values up to 80%, new technical problems arise when drilling deep water and ultradeep wells. Such problems are compounded when the effects of high pressure and temperature are considered. High temperatures can heavily alter (and reduce) the viscosity of a drilling mud or a completion fluid and can enhance the speed of chemical reactions within such mud or fluid. These consequences can in turn result in other consequences such as for example increased dispersion or flocculation of the mud solids with resultant increase in fluid loss properties and change in the thickness of the mud cake.

In fracturing, highly viscous fracturing fluids transport the proppant, but if such fluids are left intact after fracturing, they can effectively plug the proppant pact leading to highly reduced fracture permeability of the formation. Polymers such as guar, which is a naturally occurring material, or hydroxypropyl guar, have been used in aqueous solutions to provide substantial viscosity to fracturing fluids. However, the viscosity of such polymers degrades with increasing temperature and shear, requiring continuous addition of polymer and on-time mixing to maintain the viscosity of the fracturing fluid.

There continues to be a need for more versatile drilling, completion and fracturing fluids and for more efficient methods of using such fluids.

SUMMARY OF THE INVENTION

In the method of the present invention, a "multi-viscous" fluid, or a fluid having "multiviscosity" is used for drilling and completion or for fracturing. By being "multi-viscous," the fluid has enhanced flexibility for use in drilling or completing a borehole penetrating a subterranean formation, or in fracturing the subterranean formation. As used herein, the terms "multi-viscous" and "having multi-viscosity" mean capable of different and controlled viscosities at different locations in a drilling column.

The particular viscosity of the fluid at a given time is controlled by an electrical potential applied (or not applied) to the fluid. The greater the electrical potential applied, the more viscous the fluid will become. Removal or cessation of the potential field causes the fluid to revert to its original viscosity. Thus, the viscosity of the fluid is controlled by applying and increasing or decreasing or removing an electrical potential on the fluid. Such fluids may also be called "electro-rheological fluids."

According to the method of the invention, an electrical current or potential is applied to such fluid to increase the viscosity of the fluid as the fluid is introduced, or after the fluid is introduced, into a borehole penetrating the subterranean formation. The exact amount of the potential will depend on the desired viscosity of the fluid and the formation characteristics such as in situ stress and temperature. The potential may be adjusted and consequently the viscosity of the fluid may be adjusted to suit the purpose of the fluid in the borehole or the formation. Different potentials or no potentials may be applied at different depths of a borehole so that the same fluid may have different viscosities at such different depths even simultaneously.

BRIEF DESCRIPTION OF THE DRAWINGS

This file of this patent contains at least one drawing executed in color. Copies of this patent with color drawings are provided to the Patent and Trademark Office with payment of the necessary fee.

DETAILED DESCRIPTION OF PREFERRED EMBODIMENT

The present invention provides a new method for using multi-viscous fluids having an oil or synthetic fluid base for drilling and completion or fracturing operations. The invention can decrease drilling costs and increase efficiency of drilling, completion and fracturing operations.

The invention can also prevent some common problems such as fluid loss and fluid flow from the formation to the well (kick) at abnormal pressure zones. The invention can further be used to stabilize a wellbore and can prevent or create a fracture as desired.

Fluids suitable for use in the invention may be any non-conductive, preferably Newtonian, fluid known or found to be useful as a fluid base for drilling, completion or fracturing operations in a subterranean formation and especially operations related to the search for or recovery of hydrocarbons. Preferably, such fluid is mineral or oil based and is mixed with clay having high surface area. As used herein, the term "high surface area" means porous, such as bentonite (with a surface area of about 820 square meters per gram) or zeolite, or kaolinite (with a surface area of about 100 square meters per gram). Metal organic materials, such as for example manganese napthenate, may be added to the fluid to enhance the effects of an electrical potential on the fluid.

Any fluid whose viscosity changes upon application of an electric current or electric potential may be used in the method of the invention. Essentially all oil-based and synthetic fluids useful in wellbore operations will demonstrate such behavior.

In applying the method of the invention in drilling and completing a wellbore, or in fracturing a wellbore, electric current is applied at selected parts of the well to change the viscosity of the fluid as desired at such parts of the well.

Figure 1:
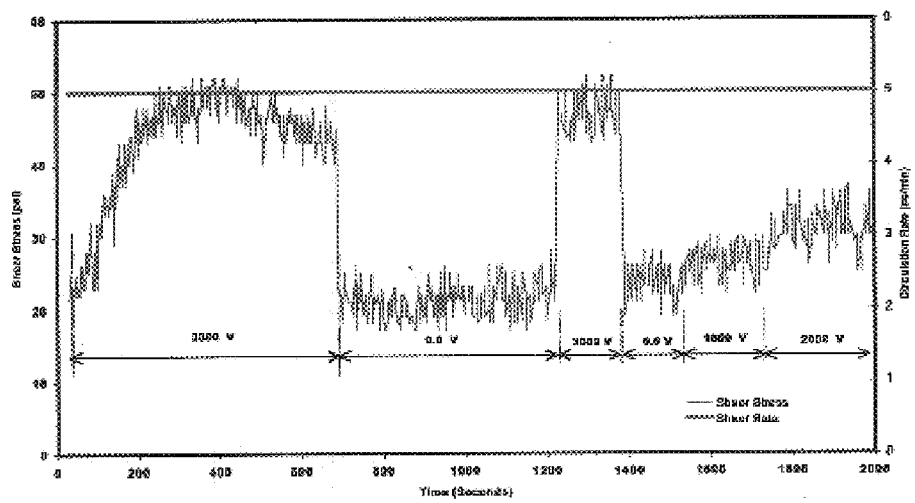
FIG. 1 provides a graph showing the variation of shear stresses of an oil base drilling fluid as a function of variable electric field at constant shear rate.

FIG. 1 provides a graph showing the variation of shear stress of a hydrocarbon oil-based drilling fluid (with an additive, namely bentonite, and a small amount of water), as a function of variable electric field at constant shear rate. Shear rate in this test corresponds to circulation rate in a borehole in the field. Shear stress in the test corresponds to viscosity of the fluid in a borehole in the field. As the graph shows, for this fluid, the shear stress (viscosity) increased and held relatively steady upon the application of different voltages with the higher the voltage resulting in the greater the stress (viscosity). Also turning the voltage on or off resulted in immediate change in such stress (or viscosity).

Figure 2:
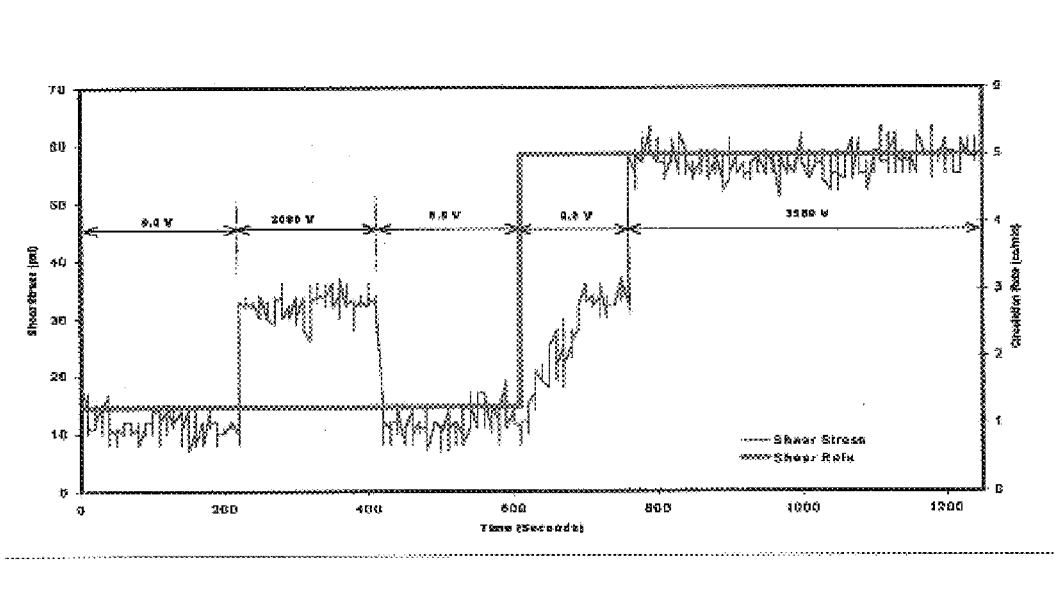
FIG. 2 provides a graph showing the variation of shear stresses of an oil base drilling fluid as a function of shear rate and variable electric field.

These patterns occur even when the shear rate (circulation rate) is changed, as shown in FIG. 2. FIG. 2 provides a graph showing the variation of shear stresses on the same hydrocarbon oil-based drilling fluid as used in the test graphed in FIG. 1. However, in the test graphed in FIG. 2, the variation of shear stress is shown as a function of shear rate and variable electric field.

Figure 3:
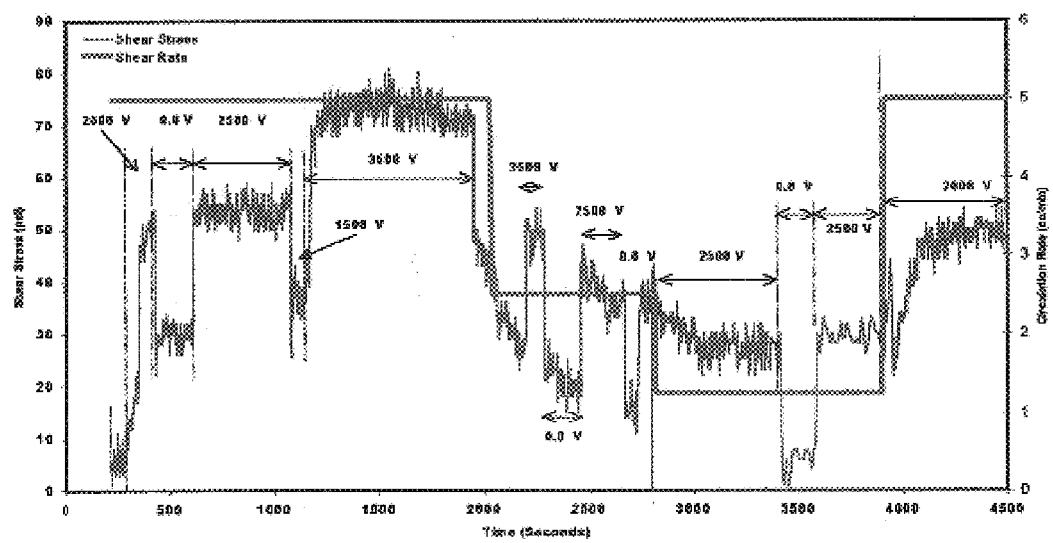
FIG. 3 provides a graph showing the shear stress response of a mineral oil base drilling fluid as a function of shear rate and electrical potential.

The patterns observed in FIGS. 1 and 2 were similarly observed when a different oil based fluid was tested. FIG. 3 shows the graph of test results with a mineral oil based drilling fluid. Specifically, the shear stress response of the fluid is depicted as a function of shear rate and variable electric field.

It is known that in drilling operations, both fluid and rock fragments are moving. Complicating the situation further is the fact that the fluid velocity varies from minimum at the well wall to maximum at the center of the well. In addition, the rotation of the drill-pipe imparts centrifugal force on the cuttings, which affects their relative location in the annulus. Keeping the flow velocity profile of the fluid as flat as possible is important for homogeneous transport conditions in transporting the solid particles along and up the annular transversal section. Keeping a constant limit on the concentration values of the cuttings during the transport is also important to avoid solid particle deposition inside the well. Such deposition can lead to a risk of borehole occlusion (being greatly emphasized whenever the drilling or fracturing fluid is unable to hold up the solid particles if and when pumping stops). It is also known that any drilling and completion fluid having a high viscosity requires higher pumping pressure which potentially can overcome the fracture gradient of the formation causing fracturing and wellbore instability.

Multi-viscous fluids used according to the present invention significantly help overcome these known problems and help achieve these desired goals.

In applying the method of the invention in drilling a wellbore, the drilling column is fitted with multiple electrical sources or transmitters or other means for imparting an electrical current to drilling fluid in the wellbore. Electric current may be applied at selected parts of the drilling column to change the drilling fluid (or drilling mud) viscosity. The timing and location of application of the current and the amount of current or the voltage used will depend on the physical and mechanical properties of the rock and stresses on the formation. Information about such properties and stresses may be obtained as known in the art through, for example, log data analysis, direct measurements, analysis of cuttings, etc. Real time mentoring, calculation, and interpretation of data directly related to or coupled with the magnitude and location of changes in the fluid viscosity will achieve optimum transport ratios for cuttings, stability of the hole, etc. Generally, when the multi-viscous fluid is to be used as a drilling fluid, the electrical potential may typically or preferably be increased when the fluid is in the borehole, allowing an increase in the viscosity of the fluid to facilitate the cuttings transport, and typically or preferably decreased or eliminated when the fluid is being pumped to reduce the viscosity of the fluid to avoid high pumping pressure that might fracture the formation.

The method of the invention for completing a wellbore is similar to the method for drilling a wellbore. The well is fitted with electric current sources or transmitters or other means for imparting an electrical current to the well completion fluid. As in drilling, the timing and location of application of the current and the amount of current or the voltage used will depend on the physical and mechanical properties of the rock and stresses on the formation.

In applying the method of the invention to fracturing a subterranean formation, again as in the methods of drilling and completion, the well is fitted with electric current sources or transmitters or other means for imparting an electrical current to the fracturing fluid. No potential or low potential is applied to the fluid for low viscosity while the fluid is pumped down the well, leading to a low friction pressure drop. The fluid is allowed to enter at least one zone to be fractured. A high potential is applied at the fracture point of the formation for the maximum required viscosity of the fracturing fluid in the fracture so that the fluid may transport proppant into the fracture, and help facilitate fracturing. Upon completion of the fracturing treatment, the electrical potential is lowered or removed to ease removal of the fluid, and the fluid then reverts to low viscosity. Thus, having a multi-viscosity fluid during a fracturing treatment has advantages that can enhance the fracturing process, in a similar manner as such fluid provides in drilling and completion operations.

The foregoing description of the invention is intended to be a description of preferred embodiments. Various charges in the described method can be made without departing from the intended scope of this invention as defined by the appended claims.

We claim:

1. A method for controlling or modifying the viscosity of an oil or synthetic fluid based wellbore fluid in a wellbore penetrating a subterranean formation to fracture said formation, said method comprising:

determining the amount of viscosity desired to effect said fracture;

determining the electrical potential that, when applied to or contacted with said fluid, will cause said fluid to have said viscosity desired;

providing said electrical potential to said fluid or contacting said fluid with said electrical potential, at the point in the wellbore at which the fracture in the formation is desired;

continuing said application or contact of said electrical potential to said fluid until said fracture is effected.

2. The method of claim 1 wherein said fluid is also used for drilling said wellbore when said electrical potential is not applied.

3. The method of claim 1 wherein said fluid is also used for completing said wellbore when said electrical potential is not applied.

4. The method of claim 1 wherein said fluid is also used for both drilling and completing said wellbore when said electrical potential is not applied.

5. The method of claim 1 wherein said fluid is also used for a well treatment operation when said electrical potential is not applied.

6. The method of claim 1 wherein said fluid is a Newtonian fluid.

7. The method of claim 1 further comprising considering the depth of the wellbore and wellbore conditions at such depth in determining the desired viscosity of the wellbore fluid and the electrical field and the electrical potential needed to effect such viscosity for fracturing said formation.

8. The method of claim 7 wherein said wellbore is fitted with at least one electrical source or transmitter in the zone of said formation to be fractured to effect application of said potential to said wellbore fluid in said zone.

9. A method for fracturing a subterranean formation, said method comprising:

introducing into a borehole penetrating said formation an electro-rheological fluid;

allowing said fluid to enter said formation from said borehole in the zone of said formation to be fractured;

applying an electrical potential to said fluid at the fracture point of the formation so as to increase the viscosity of said fluid in said zone to facilitate fracturing;

fracturing said formation;

reducing or eliminating said potential such that the viscosity of said fluid decreases in said formation after fracturing of said formation; and removing said fluid from said formation and said borehole.

10. The method of claim 9 wherein said fluid comprises an oil or synthetic fluid base.

11. The method of claim 10 wherein said fluid is a drilling fluid used in drilling said borehole.

12. The method of claim 9 wherein said fluid comprises proppant.

13. The method of claim 9 wherein no potential or low potential is applied to said fluid while the fluid is introduced into the wellbore so that the fluid has low viscosity, a low friction pressure drop occurs, and the fluid enters the formation.

14. A method for drilling a borehole penetrating a subterranean formation, and for fracturing said formation, during said drilling, said method comprising:

fitting said borehole with electrical sources or transmitters;

using an electro-rheological fluid as a drilling and fracturing fluid in said borehole;

using said electrical sources or transmitters to selectively apply an electrical potential to said fluid to selectively increase the viscosity of said fluid to entrain drill cuttings or to facilitate fracturing of the formation; and reducing said electrical potential to facilitate pumping of said fluid or removal of said fluid from the formation or the borehole.

15. The method of claim 14 wherein said fluid is also used for completion of said borehole.

16. The method of claim 14 wherein the electrical potential applied to said fluid for fracturing said formation is greater than the electrical potential applied to said fluid for entraining drill cuttings.

* * * * *